US010713033B2

(12) United States Patent
Hempel

(10) Patent No.: US 10,713,033 B2
(45) Date of Patent: Jul. 14, 2020

(54) METHOD FOR ADAPTING THE FIRMWARE OF A HEARING AID OF A HEARING AID SYSTEM AND HEARING AID SYSTEM

(71) Applicant: SIVANTOS PTE. LTD., Singapore (SG)

(72) Inventor: Thomas Hempel, Erlangen (DE)

(73) Assignee: Sivantos Pte. Ltd., Singapore (SG)

(*) Notice: Subject to any disclaimer, the term of this patent is extended or adjusted under 35 U.S.C. 154(b) by 74 days.

(21) Appl. No.: 15/993,861

(22) Filed: May 31, 2018

(65) Prior Publication Data

US 2018/0349126 A1 Dec. 6, 2018

(30) Foreign Application Priority Data

Jun. 2, 2017 (DE) .................. 10 2017 209 369

(51) Int. Cl.
*G06F 8/61* (2018.01)
*G06F 8/65* (2018.01)
*H04R 25/00* (2006.01)
*G06F 11/14* (2006.01)

(52) U.S. Cl.
CPC ............. *G06F 8/65* (2013.01); *G06F 8/61* (2013.01); *G06F 11/1433* (2013.01); *H04R 25/30* (2013.01); *H04R 25/305* (2013.01); *H04R 25/505* (2013.01); *H04R 25/558* (2013.01); *H04R 2225/39* (2013.01); *H04R 2225/55* (2013.01); *H04R 2460/07* (2013.01)

(58) Field of Classification Search
None
See application file for complete search history.

(56) References Cited

U.S. PATENT DOCUMENTS

| | | | | |
|---|---|---|---|---|
| 6,363,282 B1 * | 3/2002 | Nichols | ..................... | G06F 8/65 607/30 |
| 6,978,155 B2 | 12/2005 | Berg | | |
| 7,200,237 B2 * | 4/2007 | Zhang | ................... | H04R 25/70 381/312 |
| 2010/0098278 A1 | 4/2010 | Sorensen et al. | | |
| 2011/0119664 A1 * | 5/2011 | Kimura | ..................... | G06F 8/60 717/173 |
| 2011/0188684 A1 * | 8/2011 | Spieler | ...................... | G06F 8/65 381/315 |
| 2012/0219159 A1 | 8/2012 | Burk et al. | | |
| 2012/0311556 A1 * | 12/2012 | Matsukawa | ............. | G06F 8/654 717/171 |
| 2015/0007161 A1 * | 1/2015 | Yagi | .......................... | G06F 8/65 717/171 |

(Continued)

FOREIGN PATENT DOCUMENTS

| CH | 709679 A2 | 12/2015 |
|---|---|---|
| CN | 106598646 A | 4/2017 |
| CN | 106656565 A | 5/2017 |

(Continued)

*Primary Examiner* — Philip Wang
(74) *Attorney, Agent, or Firm* — Laurence A. Greenberg; Werner H. Stemer; Ralph E. Locher

(57) ABSTRACT

A method allows for the adaptation of the firmware of a hearing aid of a hearing aid system without compromising the convenience of the respective wearer of the hearing aid. The method is performed by a hearing aid system, which is configured for the correspondingly convenient adaptation of the firmware of the hearing aid.

10 Claims, 2 Drawing Sheets

(56) References Cited

U.S. PATENT DOCUMENTS

2016/0350100 A1* 12/2016 Folske ..................... G06F 8/65

FOREIGN PATENT DOCUMENTS

| | | |
|---|---|---|
| CN | 106775898 A | 5/2017 |
| DE | 10053116 A1 | 5/2001 |
| EP | 2178315 A2 | 4/2010 |
| KR | 20170045739 A | 4/2017 |

* cited by examiner

METHOD FOR ADAPTING THE FIRMWARE OF A HEARING AID OF A HEARING AID SYSTEM AND HEARING AID SYSTEM

CROSS-REFERENCE TO RELATED APPLICATION

This application claims the priority, under 35 U.S.C. § 119, of German application DE 10 2017 209 369.2, filed Jun. 2, 2017; the prior application is herewith incorporated by reference in its entirety.

BACKGROUND OF THE INVENTION

Field of the Invention

The invention relates to a method for adapting a firmware of a hearing aid of a hearing aid system. The invention further relates to a hearing aid system having a hearing aid.

A hearing aid is used to provide a hearing-impaired person with acoustic signals from the environment, which are processed and in particular amplified, to compensate for the respective hearing impairment. To this end, a hearing aid usually contains an input transducer, for example in the form of a microphone, a signal processing unit with an amplifier, and an output transducer. The output transducer is typically implemented as a miniature loudspeaker and is also referred to as an earpiece or receiver. In particular, it generates audible output signals (i.e. sound), which are directed to the patient's auditory system where the desired auditory percept is generated.

In order to satisfy the wide range of individual needs, different designs of hearing aids are available. In the case of so-called in-the-ear (ITE) hearing aids, a housing, which contains all the functional components including the microphone and the receiver, is worn at least partially inside the auditory canal. Completely-in-canal (CIC) hearing aids are similar to the ITE hearing aids, except they are worn completely inside the auditory canal. In behind-the-ear (BTE) hearing aids a housing having components, such as a battery and the signal processing unit, is worn behind the ear. Depending on the design, the receiver can be positioned either directly in the auditory canal of the wearer (so-called ex-earpiece hearing aids or receiver-in-the-canal (RIC) hearing aids). Alternatively, the receiver is arranged inside the housing itself. In this case, the acoustic output signals of the receiver are passed from the housing to the auditory canal by a flexible sound tube, also referred to as a tube.

A hearing aid system refers to a functional unit, which contains at least one hearing aid, and optionally at least one peripheral unit that interacts with it, for example, a remote-control unit, a programming device, or (in the case of a hearing aid with a rechargeable battery) a charging station. In the limiting case the hearing aid system can thus be formed by just a hearing aid itself, if the entire functionality required to operate the hearing aid is implemented in this hearing aid itself. In another application case, the hearing aid system is formed by two interacting hearing aids (e.g. for binaural reproduction of acoustic information). In yet another application, the hearing aid system is formed from one hearing aid or of two interacting hearing aids and at least one peripheral unit of the kind described above. Finally, the peripheral unit can be a software module (e.g. in the form of an app), which is installed and capable of running on an external device, such as a smartphone, a tablet or a personal computer. In the latter case, only the software module belongs to the hearing aid system, but not the external device on which it runs.

The wiring logic of modern hearing aids is usually based wholly or partly on software-controlled control components. The functionality of such a hearing aid is therefore usually implemented, at least in part, in the form of a control program (firmware) supplied by the hearing aid manufacturer, which is executed during the operation of the hearing aid. To ensure a continuous trouble-free and reliable functioning of a hearing aid, the respective hearing aid manufacturers offer firmware updates. By means of such updates, for example, programs and data installed on the hearing aid can be updated, security defects can be corrected and new features applied retrospectively or existing functionalities improved.

To activate firmware updates, hearing aid wearers are normally obliged to visit an audiologist or a hearing aid engineer, who imports and installs the updates on the respective hearing aid (i.e. transfers them in the form of installation files into a memory of the hearing aid). This often involves extra effort, however, for example due to the need to make an appointment with the audiologist. Therefore, many hearing aid wearers neglect just such an "upgrade" of the device software and instead simply tolerate losses of hearing quality and/or the functionality of their hearing aids.

U.S. patent publication No. 2011/0188684 A1 discloses a method for implementing a wireless firmware update for a hearing aid. In addition, U.S. Pat. No. 6,978,155 B2 discloses a method for adapting the firmware of a hearing aid system comprising a mobile phone and a hearing aid.

BRIEF SUMMARY OF THE INVENTION

The object of the invention is therefore to make a firmware update of a hearing aid simpler and more user-friendly for the hearing aid wearer.

As part of the method according to the invention, which is applied to adapt the firmware of a hearing aid of a hearing aid system, a firmware update for the hearing aid is provided. The start time for the loading and/or installation of the firmware update on the hearing aid is determined independently by the hearing aid system, wherein the start time for the loading and/or the installation of the firmware update is determined according to the operating state of the hearing aid.

The independent determination of the start time of both an importation process—i.e. loading a firmware update which may also need to be installed at a later time—and the installation of the update itself can cause possible compromises to the convenience of the wearer.

With regard to the deployment of the firmware update, the invention allows for different possibilities. A first possibility is that a firmware update is already stored on the hearing aid itself at the time of delivery or sale of a device—this possibility is particularly convenient when the purpose of the update is an extension of the hearing aid functionality, which can be optionally enabled by the hearing aid wearer (for example, on demand or as part of a license extension). Alternatively, the firmware update in the context of the invention can be loaded onto the hearing aid already used by the hearing aid wearer, and subsequently—either immediately after the loading or after a delay—installed on the hearing aid.

Advantageously, the availability of a firmware update is verified in advance using the hearing aid system. This verification can be performed in the context of the invention either by the hearing aid itself or by a peripheral unit of the above-mentioned type.

In a preferred embodiment of the invention, in addition to the hearing aid itself the hearing aid system contains an app for the control and configuration of the hearing aid, wherein this app is installed on an external device (such as a smartphone of the hearing aid wearer). In this case, the availability of a new update is preferably checked on a regular basis by the app, e.g. by access to a server over the internet. If a new update is available on the server, it is then advantageously downloaded to the external device by the app. If the hearing aid is coupled with the external device using data transfer technology, the update is then transmitted by the app from the third-party device onto the hearing aid where it is either temporarily stored (until a convenient start time for the installation is reached) or else installed immediately after the import process.

The start time for the import and/or for the installation of the firmware update is determined according to the operating state of the hearing aid. Specifically, the start time is determined on the basis of data that characterize the operating state of the hearing aid. To provide the data characterizing the operating state, in particular, periods of time are detected in which the hearing aid is switched on or switched off. In addition or alternatively, periods of time are detected in which the hearing aid may be in a power-saving mode.

In a preferred configuration, additionally or as an alternative, time periods are detected in which the hearing aid is operated in specific hearing programs which are typical of a period of inactivity of the hearing aid user. In other words, the start time for the loading and/or installation of the firmware update is preferably determined in accordance with the periods in which the hearing aid is either not being operated, or is being operated in a hearing program which is typical of a period of inactivity of the hearing aid user. In particular, such periods detected as being suitable for the loading and/or installation of a firmware update are also those in which the hearing aid operation will not be disturbed or undesirably interrupted by the loading and/or installation of the firmware update.

These may include, for example, regularly recurring times spent travelling on public transport, such as the daily work or school commute, or regular business trips. The identification and/or detection of such periods can be effected in various ways within the context of the invention. Advantageously, the periods are identified using GPS, by the detection of movement and/or on the basis of typical ambient sounds. It is also advantageous to identify periods of time spent on public transport on the basis of public, i.e. freely available, travel schedules. If a hearing aid wearer boards a means of transport, for example, whose arrival time at the destination is known based on the knowledge of the relevant schedule, then the hearing aid system (conveniently by means of a peripheral unit associated with it) can identify the period of time between the departure and the scheduled arrival and use this period for importing and/or installing a firmware update.

Other periods detected as being suitable for the loading and/or installation of a firmware update are preferably those in which no data streaming to the hearing aid is taking place, or else situations or periods during which noise received by the hearing aid is typically not dominated by speech or music.

Additionally or alternatively, periods are also detected in which the hearing aid wearer is not wearing the hearing aid in or on the ear—this information is acquired, for example, by observation of the acceleration acting on the hearing aid using an acceleration sensor, or by measurements of the acoustic feedback path of the hearing aid. From these data, preferably observed over a fairly long period of time, the hearing aid system will preferably identify rest periods in which the hearing aid user is typically not using the hearing aid, or in which the hearing aid is typically not receiving any meaningful input signal. Advantageously, the start time for the loading and/or the installation of the firmware update on the hearing aid is determined by the hearing aid system in such a way that it occurs in a resting period. In a particularly advantageous application case, the hearing aid system determines the typical period of night-time rest of the hearing aid wearer in this way. The downloading and/or installation of an available firmware update is preferably performed by the hearing aid system either at or with a specified delay following the typical beginning of the night-time rest period. In a refined alternative design of this method, the downloading and/or installation of an available firmware update is started at or with a specified delay following the time at which the hearing aid wearer removes the hearing aid from their ear within the typical night-time rest period.

The loading and/or installation of an available firmware update are started preferably automatically by the hearing aid system.

In a further preferred arrangement of the invention, the start time for the loading and/or installation of the firmware update is determined according to the charging state of a battery of the hearing aid. The downloading and/or installation of an available firmware update is preferably started by the hearing aid system in particular only when the charging state of the battery is sufficiently high. Otherwise, the update is postponed and its loading and/or installation is carried out at a later time—when the battery is sufficiently charged.

More preferably, the start time for the loading and/or installation of the firmware update is determined in accordance with the data transmission capacity of an available data connection, by which the hearing aid system is connected to a server providing the firmware update. In particular, the firmware update is downloaded to the hearing aid system only if a sufficiently powerful data transmission connection exists.

In an advantageous design of the method, before the loading and/or installation of the firmware update a backup copy of an original version of the firmware installed on the hearing aid is created. The firmware update is then checked for errors after its installation. If an error is detected, the original version of the firmware is restored; in other words, it is re-installed so that it can be run on the hearing aid. This ensures that a version of the operating program necessary for using the hearing aid is installed on the hearing aid at any time. Thus, even in the event of a failed update it is possible to use the hearing aid.

In a further preferred arrangement of the invention, a parameter set with which the hearing aid was configured under the original version of the firmware, is automatically restored again after the firmware update. It is therefore automatically ensured that after the firmware update the hearing aid is operated with the same settings as before the firmware update. The parameter set contains, in particular, the configuration data for the individual hearing programs and/or those preferred by the hearing aid user. The listening comfort of a hearing aid wearer is therefore guaranteed without restrictions even after a firmware update.

The hearing aid system comprising a hearing aid within the context of the invention is configured to independently determine the starting time for loading and/or installing on the hearing aid a firmware update provided for the hearing aid, in accordance with the operating state of the hearing aid. The hearing aid system is therefore configured for carrying out the method according to the invention described above. Functional design variants of the hearing aid system therefore arise from the above-described embodiments of the method.

In a preferred design the hearing aid system is configured to independently determine a starting time for loading and/or installing a firmware update provided on the hearing aid in accordance with the periods of time in which the hearing aid is either not being operated or is being operated in a hearing program which is typical of inactivity of the hearing aid user. These are preferably understood to mean periods in which the hearing aid operation is not disturbed or undesirably interrupted by the loading and/or installation of the firmware update.

The wearers themselves need not be actively involved in loading and/or installing the update of the firmware installed on their hearing aid, nor is a visit to a hearing aid engineer necessary.

In an advantageous design of the invention, the hearing aid itself is configured to independently determine the starting time for the loading and/or installation of a firmware update provided for the hearing aid (without any peripheral device having to be used or even be present at all).

Alternatively, in addition to the hearing aid the hearing aid system comprises a peripheral unit, which is configured to independently determine the starting time for the loading and/or installation of a firmware update provided for the hearing aid.

Further advantageous embodiments of the hearing aid system arise from the dependent claims oriented to the method.

Other features which are considered as characteristic for the invention are set forth in the appended claims.

Although the invention is illustrated and described herein as embodied in a method for adapting the firmware of a hearing aid of a hearing aid system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
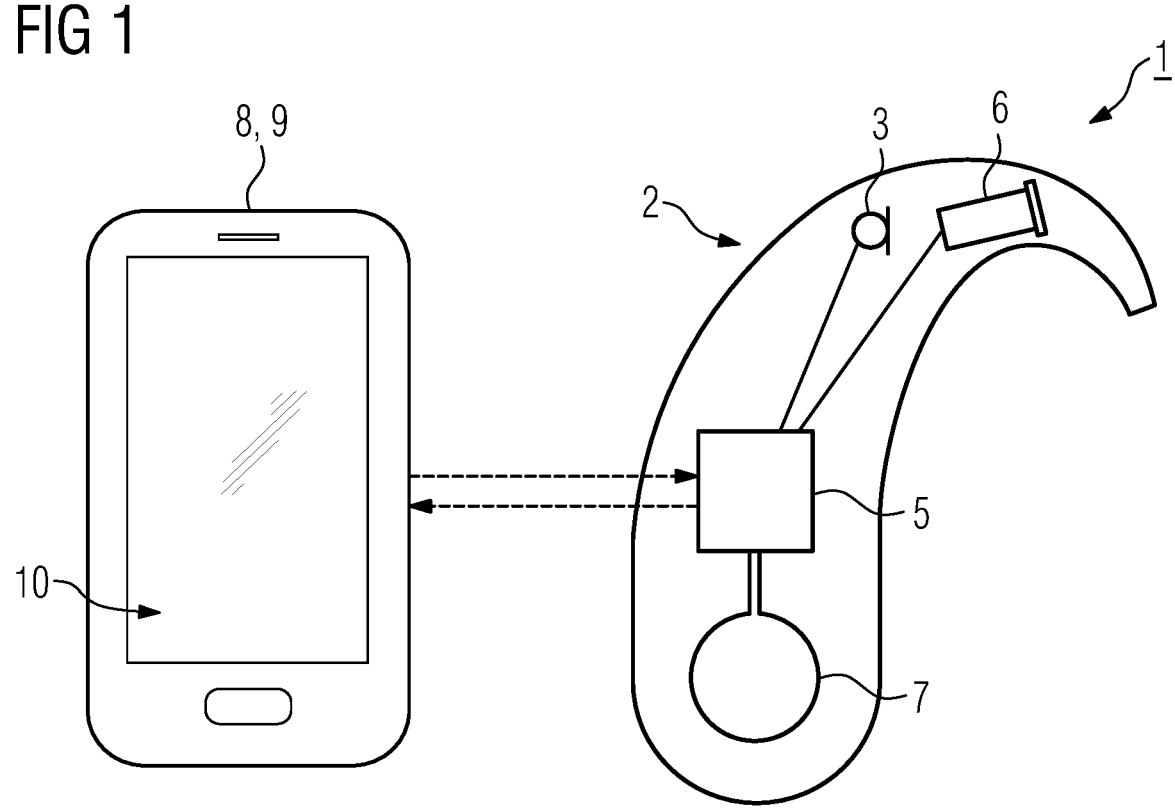
FIG. 1 is a schematic representation of a hearing aid system with a hearing aid and a smartphone as a peripheral device.

Equivalent parts and variables are provided with identical reference numerals in all figures.

Referring now to the figures of the drawings in detail and first, particularly to FIG. 1 thereof, there is shown a schematic representation of a hearing aid system 1. In the present case the hearing aid system 1 contains a hearing aid 2 to be worn behind the ear with a microphone 3, a signal processing unit 5, an earpiece or receiver 6, and a battery 7. The hearing aid system 1 further contains a peripheral device 9 implemented as a smartphone 8.

The smartphone 8 and the hearing aid 2 are linked together. In the present case, by means of an app 10 installed thereon the smartphone 8 determines the start time for loading a firmware update provided by the hearing aid manufacturer on its internet site. The app 10 then starts the loading of the firmware update on the hearing aid 2 automatically at the determined start time.

Figure 2:
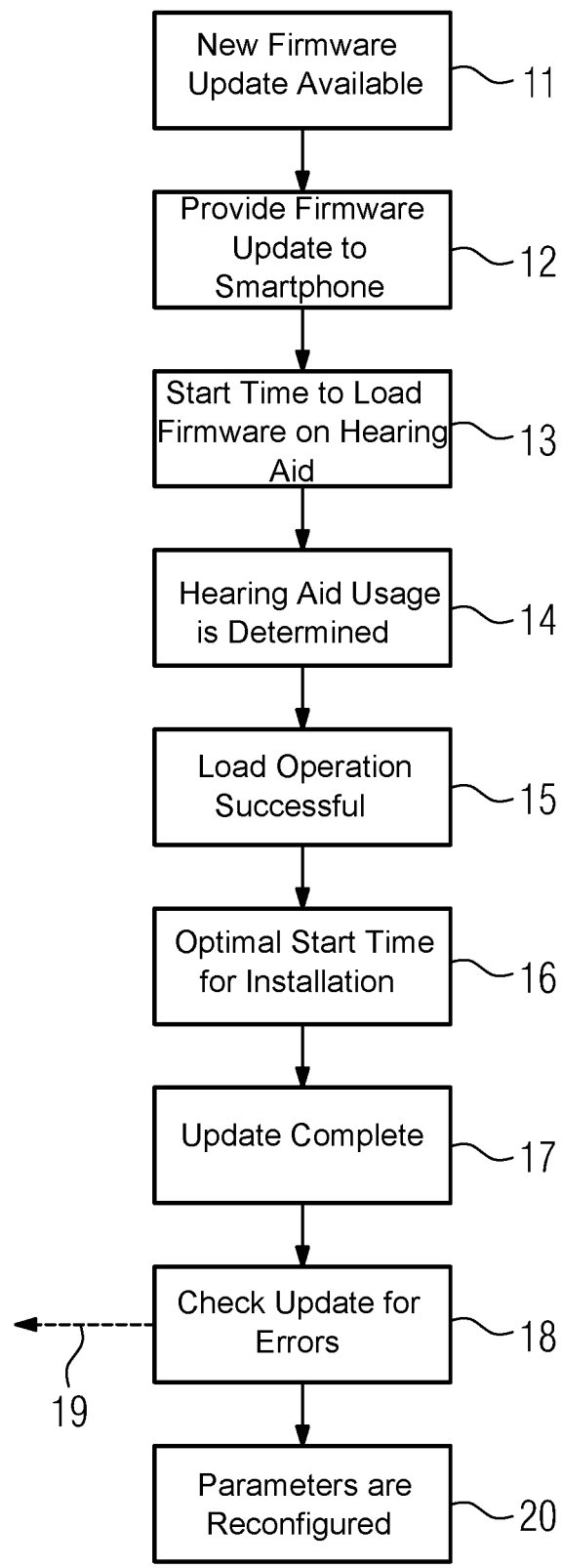
FIG. 2 is a flow chart showing a method sequence for adapting firmware of a hearing aid.

The detailed method sequence for this is shown in FIG. 2. At the start, it is determined whether a new firmware update is available for the hearing aid 2 (step 11). The smartphone 8 and/or the app 10 is also used for this purpose. If a new firmware update is available for the hearing aid 2, then this is provided the smartphone 8 (step 12). To do so, the smartphone 8 or app 10 downloads the firmware update from the internet site of the hearing aid manufacturer. A starting time for the subsequent loading of the firmware update on the hearing aid 2 is then determined independently by the smartphone 8 (as part of the hearing aid system 1) (step 13).

To determine the starting time, different data items are used which characterize the operating state of the hearing aid 2. In addition to the charge status of the battery 7 and the data transfer capacity of a data connection of the hearing aid system 1 to a server providing the firmware update, in particular, the usage state of the hearing aid 2 is taken into account. To do this, in particular, the time periods are taken into account in which the hearing aid 2 is operated in specific hearing programs which are typical of a period of inactivity of the hearing aid user.

The information items regarding the usage state of the hearing aid 2 are determined in particular on the basis of the typical user behavior on the part of the hearing aid wearer. The typical user behavior describes the periods during which the hearing aid wearer usually wears the hearing aid 2 in or on their ear, or simply not at all. The data describing this user behavior are monitored and stored over a fairly long period of time.

On the basis of the observed and stored data, the hearing aid system 1 determines expected values that describe rest periods, in other words periods of time in which the hearing aid user typically does not use the hearing aid 2, or in which the hearing aid 2 typically does not receive a meaningful input signal.

To determine the starting time for loading the available firmware update onto the hearing aid 2, the current user behavior of the hearing aid wearer is correlated with the expected values. If, for example, the hearing aid wearer takes the hearing aid 2 from their ear at a time which contradicts his/her usual user behavior, then from the correlation of the current data and the corresponding expected values it is determined that no update should be installed, since it can be assumed that this is an unscheduled period of non-use and it must be assumed that the hearing aid wearer 2 will soon reinsert and resume using the hearing aid. In other words, the user behavior does not then correspond with the expected values, so that the firmware update is not installed.

If the expected values (i.e. the expected user behavior) do correspond with the current data (i.e., the actual user behavior)—for example, if a non-use of the hearing aid 2 is determined within the typical night-time rest period—then the available firmware update can be installed. The loading is then carried out by the hearing aid system 1 either at or with a predefined delay after the beginning of the night-time rest period.

After the loading is completed the hearing aid system 1 checks whether the loading operation was successful (step 15). If errors are found in the loading process (for example, due to errors in the data transfer), then the firmware update is not installed on the hearing aid 2. Otherwise, the hearing aid system 1 and/or the app 10 of the smartphone 8 determines the optimal start time for the installation (step 16).

In this case, analogously to step 14, factors such as the charge status of the battery 7, the existence of a stable data connection and the operating state of the hearing aid 2 itself, are also taken into account. Accordingly, for determining the start time for the installation of the previously loaded firmware update, the procedure described previously in relation to the correlation of the actual user behavior with the current user behavior applies in the same way. If the actual user behavior matches the expected values, then the firmware update—in particular delayed relative to the typical beginning of the respective period of non-usage of the hearing aid 2—is installed.

The installation of the corresponding firmware update is started automatically at the determined time within the relevant time period and is terminated again after the update is completed (step 17). Finally, the installed firmware update is checked for errors (step 18). In the event that the firmware update contains errors or has failed, the original firmware of the hearing aid 2 is restored (indicated by arrow 19). Finally, on successful completion of the firmware update, the parameters of the hearing aid 2 (in particular, the hearing programs used by the hearing aid wearer) that were configured in the hearing aid system 1 before the firmware update are automatically re-configured (step 20). The firmware of a hearing aid 2 can thus be modified without restrictions for the wearer in a simple and convenient way.

The invention is particularly clearly described in the exemplary embodiments described above, but at the same time is not limited to these exemplary embodiments. On the contrary, further embodiments of the invention can be derived from the claims and the above description.

The following is a summary list of reference numerals and the corresponding structure used in the above description of the invention:

1 hearing aid system
2 hearing aid
3 microphone
5 signal processing unit
6 receiver
7 battery
8 smartphone
9 peripheral device
10 app
11 method step
12 method step
13 method step
14 method step
15 method step
16 method step
17 method step
18 method step
19 method step
20 method step

The invention claimed is:

1. A method for adapting firmware of a hearing aid of a hearing aid system, which comprises the steps of:
   initiating a loading and/or an installation of a firmware update for the hearing aid;
   determining a start time for the loading and/or for the installation of the firmware update on the hearing aid independently by the hearing aid system, the start time being determined in accordance with periods of time in which the hearing aid is either not being operated, or is being operated during a hearing program during which a hearing aid user is historically inactive with regards to using the hearing aid; and
   determining the start time for the loading and/or for the installation of the firmware update in accordance with an operating state of the hearing aid.

2. The method according to claim 1, which further comprises additionally determining the start time for the loading and/or for the installation of the firmware update in dependence on at least one of:
   a regularly recurring time period spent travelling on public transportation;
   a period in which no data streaming occurs in the hearing aid or in which received sound is not dominated by speech or music; or
   a period in which the user is not wearing the hearing aid in or on an ear.

3. The method according to claim 1, which further comprises additionally determining the start time for the loading and/or for the installation of the firmware update according to a charging state of a battery of the hearing aid.

4. The method according to claim 1, which further comprises additionally determining the start time for the loading and/or for the installation of the firmware update in accordance with a transmission capacity of a data connection of the hearing aid system to a server providing the firmware update.

5. The method according to claim 1, wherein before performing the loading and/or the installation of the firmware update, performing the further steps of:
   creating a backup copy of an original version of the firmware installed on the hearing aid;
   checking the firmware update for errors after a completion of the loading and/or the installation of the firmware update; and
   restoring the original version of the firmware on the hearing aid upon an error being detected.

6. The method according to claim 1, which further comprises automatically re-installing a parameter set of the hearing aid installed in the hearing aid system before the firmware update after the firmware update.

7. A hearing aid system, comprising:
   a hearing aid; and
   the hearing aid system being configured to independently determine a starting time for loading and/or installing a firmware update provided for said hearing aid in accordance with an operating state of said hearing aid, wherein the starting time being determined in accordance with periods of time in which said hearing aid is either not being operated or is being operated during a hearing program during which a hearing aid user is historically inactive with regards to using the hearing aid.

8. The hearing aid system according to claim 7, wherein the hearing aid system is configured to independently determine the starting time for the loading and/or the installing of the firmware update additionally in dependence on at least one of:
   a regularly recurring time period spent travelling on public transportation;

a period in which no data streaming occurs in said hearing aid or in which received sound is not dominated by speech or music; or a period in which the user is not wearing said hearing aid in or on an ear.

9. The hearing aid system according to claim 7, wherein said hearing aid is configured to independently determine the starting time for the loading and/or the installing of the firmware update provided for said hearing aid.

10. The hearing aid system according to claim 7, further comprising a peripheral device configured to independently determine the starting time for the loading and/or the installing of the firmware update provided for said hearing aid.

* * * * *